(12) United States Patent
Morikawa et al.

(10) Patent No.: US 9,854,814 B2
(45) Date of Patent: *Jan. 2, 2018

(54) FOOD DOUGH ROUNDING DEVICE AND FOOD DOUGH ROUNDING METHOD

(71) Applicant: Rheon Automatic Machinery Co., Ltd., Utsunomiya-shi, Tochigi (JP)

(72) Inventors: Michio Morikawa, Utsunomiya (JP); Katsumichi Higuchi, Utsunomiya (JP); Akinori Takama, Utsunomiya (JP); Shuya Sato, Utsunomiya (JP); Akira Todate, Utsunomiya (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,047

(22) Filed: Jun. 20, 2016

(65) Prior Publication Data

US 2017/0027181 A1    Feb. 2, 2017

Related U.S. Application Data

(63) Continuation of application No. 14/405,017, filed as application No. PCT/JP2013/063781 on May 17, 2013, now Pat. No. 9,392,798.

(30) Foreign Application Priority Data

Jun. 4, 2012   (JP) .................................. 2012-127512

(51) Int. Cl.
*A21C 7/00* (2006.01)
*A21C 7/02* (2006.01)

(52) U.S. Cl.
CPC . *A21C 7/02* (2013.01); *A21C 7/00* (2013.01)

(58) Field of Classification Search
CPC .................................... A21C 7/00; A21C 7/02
(Continued)

(56) References Cited

U.S. PATENT DOCUMENTS 528,886 A * 11/1894 Mishler .................... A21C 7/01
                                                                     425/332
1,067,953 A *  7/1913 Van Houten, Jr. ....... A21C 7/01
                                                                     425/332

(Continued)

FOREIGN PATENT DOCUMENTS

| JP | 96124/1985  | 7/1985 |
| JP | 103895/1985 | 7/1985 |

(Continued)

OTHER PUBLICATIONS

Canadian Examiner's Report dated Nov. 10, 2015.
(Continued)

*Primary Examiner* — James Mackey
(74) *Attorney, Agent, or Firm* — Myers Andras LLP; Joseph C. Andras

(57) ABSTRACT

A rounding device for rounding food dough is provided with a conveyance device (9) which conveys the food dough (7) and a pair of forming plates (11, 13), which, on the upper face of the conveyance device (9), are arranged so as to extend along the conveyance direction (R) of the conveyance device (9). The forming plates (11, 13) at least opposed sloped surfaces (18B, 22B). The sloped surfaces are tilted outward from the lower side to the upper side so that the gap between the sloped surfaces is narrow on the lower side and wide on the upper side. The rounding device rounds the food dough using the sloped surfaces (18B, 22B) of the pair of the forming plates (11, 13). The pair of the forming plates (11, 13) has longitudinal components which move longitudinal relative to each other in the opposite directions, and the pair of forming plates (11, 13) also has a lateral component (Continued)

which move relative to each other in the width direction perpendicular to the longitudinal direction so as to approach and separate from each other. The pair of forming palates (11, 13) can move along a movement path in which the distance of movement according to longitudinal components is greater that the distance of movement according to the lateral component.

19 Claims, 10 Drawing Sheets

(58) Field of Classification Search
USPC .............................................. 425/332, 364 R
See application file for complete search history.

(56) References Cited

U.S. PATENT DOCUMENTS

| 4,191,519 A | 3/1980 | Benier |
| 9,392,798 B2 * | 7/2016 | Morikawa ................ A21C 7/00 |

FOREIGN PATENT DOCUMENTS

| JP | 63-37827 | 3/1988 |
| JP | 4-18383 | 2/1992 |
| JP | 2000-116307 | 4/2000 |

OTHER PUBLICATIONS

European Search Report for corresponding European Application No. 13800951.9, dated Mar. 23, 2016 and communicated to applicant on Apr. 8, 2016, with no relevant documents cited.

* cited by examiner

FOOD DOUGH ROUNDING DEVICE AND FOOD DOUGH ROUNDING METHOD

RELATED APPLICATIONS

This application is a continuation of U.S. application Ser. No. 14/405,017, filed Dec. 2, 2014, now pending, which is a 371 of PCT/JP2013/063781, filed May 17, 2013, which claims priority to Japanese patent application no. 2012-127512, filed Jun. 4, 2012.

BACKGROUND OF THE INVENTION

Technical Field

The present invention relates to a technique for rounding pieces of food dough, and, in particular, relates to a machine and a process of rounding the pieces of food dough with a pair of opposing shaping plates.

Background of the Invention

In a process for manufacturing rounded pieces of food dough having a viscosity, as, for instance, that of bread dough, a sequence in which kneaded food dough is divided into predetermined quantities, and then each divided food dough piece is rounded, is provided.

Conventionally, there is a rounding machine that is provided with a pair of movable guiding plates in which the respective plates are opposed to each other such that they approach, and retract from, each other, above a base or above a conveying device for supporting and conveying divided food dough pieces. In this machine, while the respective food dough pieces are pressed between the opposed guiding plates when they are close to each other, the dough pieces are rounded by having the guiding plates swing in opposite directions, as is, for instance, disclosed in Patent Literature 1 and 2.

Further, in this conventional rounding machine, the paired guiding plates are positioned to incline outwardly from the lower side to the upper side thereof such that the distance between the opposed guiding plates is narrower at the lower side and wider at the upper side. For the respective guiding plates, the angle of installation therebetween and the distance between the installation points can be adjusted such that an angle therebetween may be smaller when the predetermined quantity of each divided dough piece is smaller, while it may be larger when the predetermined quantity of each divided dough piece is larger.

PRIOR-ART PUBLICATIONS

Patent Literature 1: Japanese Utility Model Publication No. 63 [1988]-37827
Patent Literature 2: Japanese Utility Model Publication No. 4 [1992]-18383

SUMMARY OF THE INVENTION

Object to be Addressed by the Invention

The food dough as, for instance, the bread dough, to be supplied to the rounding machine, is manually divided into the predetermined quantities or divided by any well-known divider. As for the divided food dough pieces, the shapes are uneven, and the cutting surfaces have an adhesiveness, and thus firm skin is not formed. The purposes of the rounding process are to press down the dough to cause gases to escape therefrom, to evenly form the inner layers, to form firm skin, and to evenly form the shapes, of the divided dough pieces.

In the rounding machines disclosed in the patent literature, each guiding plate is attached to the leading end of an arm that is coupled to a rotary axis of a driving motor for driving the corresponding guiding plate such that the guiding plate is moved horizontally. In the entire swinging process, there is just one point in which the opposed guiding plates can be moved in opposite directions from each other in the closest position thereof. In this manner, the force to knead the dough pieces is weakened, and is insufficient to round and form them. Further, when the guiding plates move away from each other, some dough pieces may stick to the guiding plate or plates and turn over on the conveying device. This results in a gathering point, in which the skin of each dough piece is to be gathered at the bottom of it and formed by a closing movement of the guiding plates. The location of the gathering point may be varied in each rounding operation and thus the skin cannot be constantly gathered at the same gathering point. Therefore, there is a problem in that the skins of the respective dough pieces cannot have sufficient firmnesses.

Generally, in the process of rounding the food dough piece, first, the dough piece is molded and thus rounded to produce an entire rounded dough piece to remove any protrusion on, or round off, the skin of the dough piece at the earlier stage. Then the dough piece is rounded to have a uniform shape, while the skin of it is firmly formed. In this manner, the rounding process can be efficiently carried out.

The opposed guiding plates in the above conventional rounding machine, the angle of the installation, and the distance between the installation, can be adjusted. These adjustments are made based on the predetermined quantity of each divided dough piece. The dough piece having the predetermined quantity is subject to the rounding process a few times, by means of the guiding plates that are adjusted at a predetermined angle. In the above conventional rounding machine, because the dough pieces are rounded by shaping faces that are inclined at the same angle over the length of each guiding plate, the same operations are repeated during the entire rounding process. Thus, there is a problem in that no efficient shaping-rounding process can be achieved.

Inside the divided dough piece having the predetermined quantity made of kneaded and fermented dough are distributed small and large bubbles (gases) that are not homogeneous. If such a dough piece is rounded and formed by pressurizing only the lower part of it, because the bubbles remain as a distribution that is not homogeneous, a product that is subject to a heating process, e.g., a baking process, such as a loaf of bread, involves a problem in that an uneven texture is generated inside it.

Means to Solve the Problems

One aspect of the present invention provides a rounding machine that comprises a conveying device for conveying a food-dough piece (7) and a pair of shaping plates that are arranged above the conveying device such that they extend along the travelling direction of the conveying device, wherein the shaping plates include at least opposed inclined faces, wherein the inclined faces are outwardly inclined from their lower sides to their upper sides such that the distance therebetween is narrow at the lower side and wider at the upper side, in order to round the food-dough piece using the inclined faces of the pair of shaping plates. The machine is characterized in that the pair of the shaping plates is movable along a moving locus having a longitudinal component in which the shaping plates are moved relatively in direction opposite to each other, along the longitudinal direction and a width component in which the shaping plates relatively move to approach, and retract from, each other, and along the widthwise direction perpendicular to the longitudinal direction, wherein the stroke of the moving of the longitudinal component is longer than that of the wide component.

In this case, the machine may further comprise a pushing-down member for pushing down the dough pieces to vertically move them between the pair of shaping plates. The pressing-down member may be lowered between the shaping plates when the shaping plates retract from each other, while the pressing-down member may be moved up when the shaping plates approach each other.

The pushing-dough member may be a belt conveyor running in the direction the conveying device. In this case, preferably the velocity that the conveyor belt travels is the same as that of the conveying device (9).

Another aspect of the present invention provides a process of rounding food-dough pieces by moving a pair of shaping plates along a movement locus, wherein a pair of shaping plates is arranged and extended along the travelling direction of the food-dough pieces and has at least opposed inclined faces, and wherein the inclined faces are outwardly inclined from their lower sides to their upper sides such that the distance therebetween is narrow at the lower side and wider at the upper side, wherein the movement locus has a longitudinal component in which the shaping plates are moved in relatively opposite directions, along the longitudinal direction, and a width component in which the shaping plates relatively approach and retract from each other, along the widthwise direction perpendicular to the longitudinal direction, and wherein the stroke of the moving of the longitudinal component is longer than that of the width component when the food-dough pieces are rounded. The process comprises the following steps:

(a) laterally pressing and holding the food-dough pieces (7) on a conveying device (9) by causing the shaping plates (11, 13) to approach each other in the width component;

(b) kneading the food-dough pieces (7) by moving the shaping plates (11, 13) opposite each other along the longitudinal component while the shaping plates (11, 13) are approaching each other or thereafter;

(c) releasing the food-dough pieces (7) by retracting the shaping plates (11, 13) from each other in the width component after the shaping plates (11, 13) approach each other, and during or after the kneading step; and (d) carrying out the above steps (a), (b), and (c) one or more times.

In this case, the food-dough pieces may be rounded at a plurality of positions along the longitudinal direction of the shaping plates.

In the machine and the process, the size of the inner angle F between the inclined faces may be formed to continuously increase from the upstream side to the lower stream side of the shaping plates.

The shaping plates may have protrusions that are located on the lower ends of the inclined faces and inwardly protrude therefrom. The size of each protrusion is continuously increased from the upstream side to the downstream side of the shaping plates.

In the machine and the process of the present invention, the moving locus may include a substantially oval path. In this case, the longitudinal component of the moving locus may include a substantially linear component or a non-linear component. Alternatively, the longitudinal component of the moving locus may include a substantially arc-like component.

The Advantages of the Invention

With the present invention, food dough can be rounded to obtain a firm dough surface without much damage to the food dough. Further, the present invention can press dough to cause gases to form therefrom, and a dough piece having uniform inner layers can be rounded.

BRIEF DESCRIPTION OF THE DRAWINGS

The accompanying drawings, which are incorporated in and constitute a part of the specification, schematically illustrate the preferred embodiment of the present invention, and together with the general description given above and the detailed description of the preferred embodiment given below serve to explain the principles of the present invention.

PREFERRED EMBODIMENTS OF THE INVENTION

Figure 1:
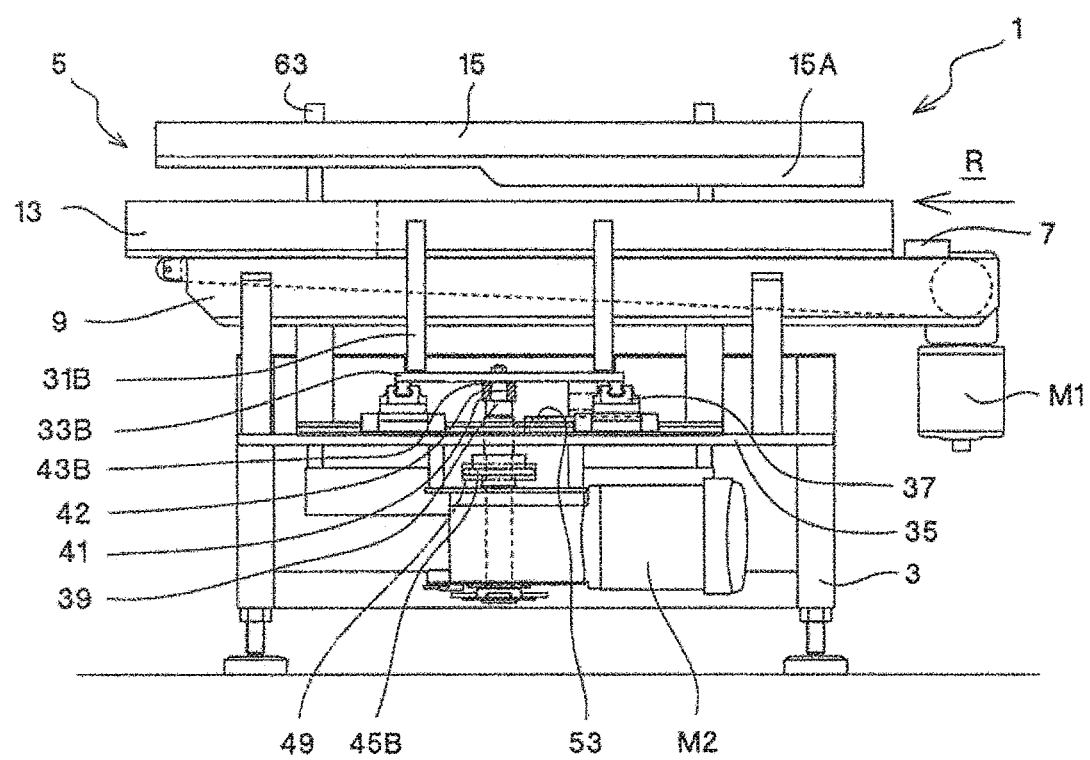
FIG. 1 illustrates a front view of the general configuration of the rounding machine of the first embodiment of the present invention.

FIGS. 1 to 5 illustrate a rounding machine 1 for rounding pieces of food dough of the first embodiment of the present invention and applied to, for instance, bread dough pieces, as examples of the food dough pieces 7. The rounding machine 1 includes a box-like main frame 3 at the top of which a rounding section 5 is located. The rounding section 5 is provided with a first belt conveyor 9 as a conveying device for conveying the bread dough pieces (the food dough pieces) 7 and a pair of opposing shaping plates 11 and 13 for kneading and rounding the bread dough pieces 7. Preferably, a pushing-down member 15 for pushing down the dough pieces is vertically moveable and provided above the opposed shaping plates 11 and is. Inside the main frame 3, a driver for causing the shaping plates 11 and 13 to approach, and retract from, each other, is provided. Also, a driver for elevating the pushing-down member 15 is provided if it is so equipped. These sources for driving the above components are controlled by a controller.

The belt conveyor 9 conveys the bread dough pieces 7, which are supplied from a dough-supplying source (not shown), by driving a control motor M1. For instance, the dough pieces 7 can be intermittently conveyed with predetermined distances therebetween that are preset in the controller in relation to the movements of the shaping plates 11, 13.

As for the shaping plates 11 and 13, one is located on one of the two sides in the width direction (the horizontal direction, perpendicular to the conveying direction) of the belt conveyor 9 and the other one is located on the other side in the width direction such that the length of each shaping plate is along the conveying direction R of the belt conveyor 9. The respective shaping plates 11 and 13 revolve along a locus of movement that comprises the longitudinal component in which the shaping plates move in opposite directions relative to each other along their lengthwise direction and the width component in which the respective shaping plates move relatively to approach and move from away each other, along their widthwise direction, and perpendicular to their lengthwise direction. The strokes of the respective shaping plates in the longitudinal component are longer than those of them in the width component. In this manner, when the shaping plates 11 and 13 are close to each other to knead the bread dough pieces 7, the shaping plates 11 and 13 move in opposite directions along the travelling direction R.

Figure 2:
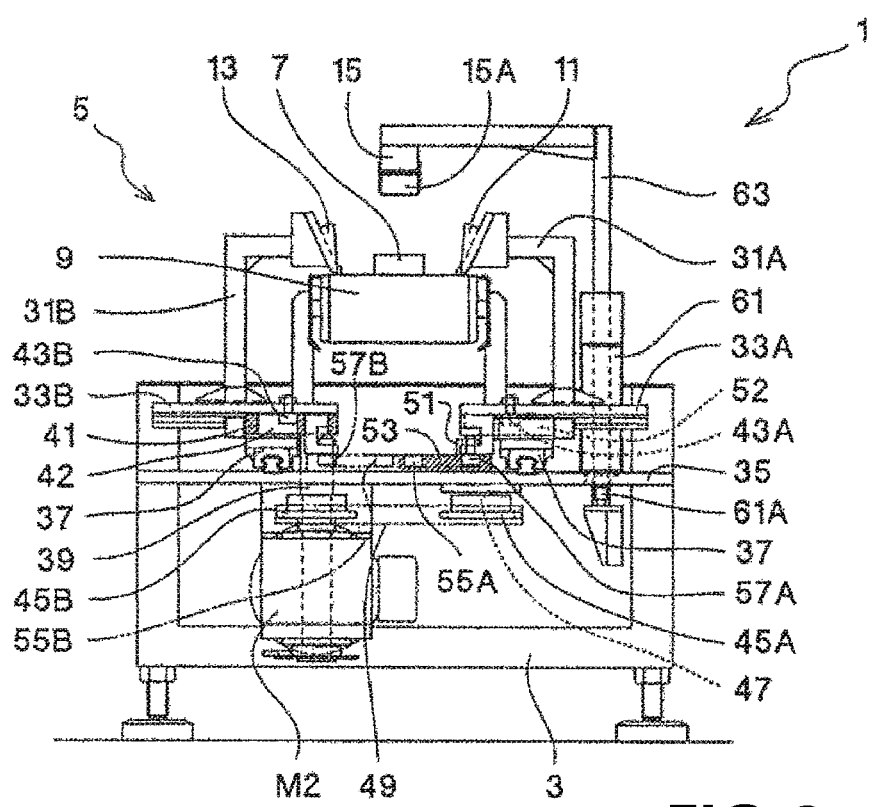
FIG. 2 illustrates a side view of the general configuration of the rounding machine of the first embodiment of the present invention.

Each shaping plate 11 or 13 is formed to have a bilateral symmetry (see FIG. 2). The shaping plate 11 and the shaping plate 13 have a shaping face 17 and a shaping face 21, respectively. The shaping faces 17 and 21 are formed symmetrically with respect to an imaginary plane (hereafter, "the middle-vertical face") that is positioned at the midpoint between the opposed shaping plates 11 and 13 and perpendicular to the conveying plane of the belt conveyor 9. The shaping face 17 includes a first shaping face 18, in which the shapes of the face vary along the length, and a second shaping face 19, which is connected to the downstream portion of the first shaping face 18. The first shaping face 18 includes a side face 18A at the lower part thereof and an inclined face 18B at the upper part thereof. The side face 18A is inclined from the end of the upstream portion of the shaping plate 11 (the right end in FIG. 1), which is located at the upstream side of the belt conveyor 9, to the inward direction (the lower direction in FIG. 3) along the length (the conveying direction). Further, the side face 18A includes a protruding section 18C, which protrudes inwardly from the lower end of the inclined face 18B such that the degree of the protrusion thereof is continuously increased from the upstream side to the downstream side of the shaping plate 11.

The inclined face 18B is outwardly (the right side in FIG. 2) inclined from the lower side to the upper side thereof such that the distance between the inclined face 18B and the middle plane is narrower at the lower side and broader at the upper side. The lower end of the inclined face 18B is formed along the length (the travelling direction) such that the degree of the inclination of the inclined face 18B is varied to outwardly increase by a constant proportion from the end of the upstream portion toward the longitudinal direction (the side of the downstream portion). That is, the inclination of the inclined face 18B is varied from a steep inclination at the end of the upstream portion to a shallow inclination along the longitudinal direction (the side of the downstream portion). The second shaping face 19 includes a side face 19A having the same shape as that of the end of the downstream portion of the first shaping face 18 and an inclined face 19B, without it being varied along its length. Both the side face 19A and the inclined face 19B are formed as a plane. Also, a protruding section 19C is continuously provided from the end of the downstream portion of the protruding section 18C.

Further, a shaping face 21 is formed for the middle plane that is symmetrical to the shaping face 17, to couple a second shaping face 22, corresponding to the first face 18, and a second shaping face 23, corresponding to the first shaping face 19 along the length (the travelling direction). The first shaping face 22 includes a side face 22A at the lower part and an inclined face 22B at the upper part thereof. The side face 22A is inclined from the end of the upstream portion of the shaping plate 13 (the right end in FIG. 1) to the inward direction (the upper side in FIG. 3) along the length. Further, the side face 22A includes a protruding section 22C, which inwardly protrudes from the lower end of the inclined face 22B such that the degree of the protrusion thereof is continuously increased from the upstream side to the downstream side of the shaping plate 13. The inclined face 22B is outwardly (the left side in FIG. 2) inclined from the lower side to the upper side thereof such that the distance between the inclined face 22B and the middle vertical plane is narrower at the lower side and broader at the upper side. The lower end of the inclined face 22B is formed along the length (the conveying direction) such that the degree of the inclination of the inclined face 22B is varied to increase outwardly by a constant proportion from the end of the upstream portion toward the longitudinal direction. The second shaping face 23 includes a side face 23A having the same shape as that of the end of the downstream portion of the first shaping face 22 and an inclined face 23, without it being varied along the length. Both the side face 23A and the inclined face 23B are formed as a plane. Also, a protruding section 23C is continuously provided from the end of the downstream portion of the protruding section 22C.

Figure 5A:
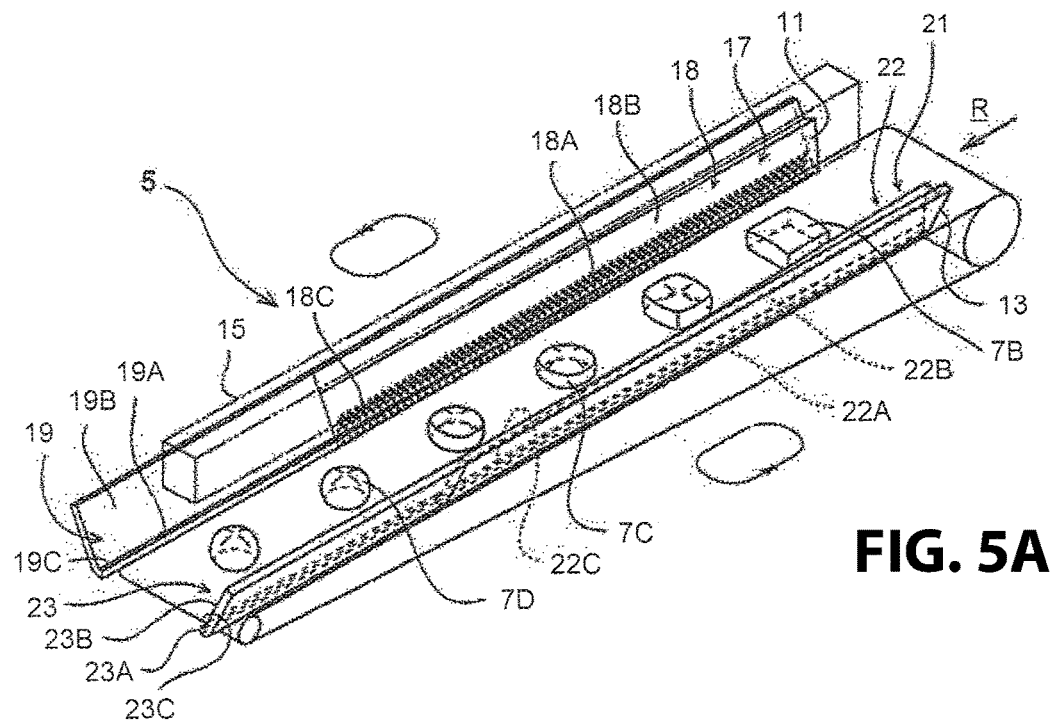
FIGS. 5A and 5B illustrate perspective views of the configuration of the main part of the shaping section equipped with the rounding machine of the first embodiment of the present invention.

On the side face 18A and the lower part of the inclined face 18B of the first shaping face, a plurality of receptacles is formed (see FIG. 5A). Similarly, on the side face 22A and the lower part of the inclined face 22B of the first shaping face 22, opposed to the first shaping face 18, a plurality of receptacles is formed. These receptacles can be pressed, and can hold the bread-dough pieces 7, without them slipping when they are kneaded, and prevent them from sticking to the shaping faces, and thus a stable rounding process can be carried out. Alternatively, to form such a corrugated surface to hold the bread-dough pieces 7 and have a high peel property, appropriate modifications may be possible, as, for instance, a pearskin-like finish may be formed by sandblasting, or non-adhesive materials of the belt having canvas-like surfaces may be affixed to the shaping plates 11, 13 themselves.

The driving mechanisms of the shaping plates 11, 13 will now be explained. The shaping plates 11 and 13 are fixed to supporting plates 33A and 33B, which move in the horizontal direction along a substantially oval locus, through supporting arms 31A and 31B. The respective supporting plates 33A and 33B are supported by linear rails 37, which are attached to the upper face of a base plate 35 of the main plate 3. The linear rails 37 are provided such that the supporting plates 33A, 33B can be moved in the conveying direction and the width direction.

A control motor M2 is mounted on the lower surface of the base plate 35 through a bracket. The upper end (the upper side in FIG. 1) of a rotating shaft 39 of the control motor M2 is attached to the proximal end of a rotating arm 41. The distal end, which is eccentric to the proximal end, of the rotating arm 41, is provided with an elongated slot 42 in which a cam follower 43B, which is suspended from the supporting plate 33B, is movably engaged.

The middle position of the rotating shaft 39 is provided with a sprocket 45B. Also, the lower end of a rotating shaft 47, which is rotatably supported by the base plate 35 under the supporting plate 33A, is provided with a sprocket 45A. The sprocket 45A and the sprocket 45B are coupled to a chain 49 such that they are synchronously rotated in the same direction. The upper end of the rotating shaft 47 is fixed to the proximal end of a rotating arm 51. The distal end, which is eccentric to the proximal end, of the rotating arm 51, is provided with an elongated slot 52 in which a cam follower 43A, which is suspended from the supporting plate 33A, is movably engaged. The rotating arm 41 and the rotating arm 51 are arranged such that they are synchronously rotated with a phase difference of 180 degrees, as viewed from above (see FIG. 4).

Attached to the upper surface of the base plate 35 is a guiding member 53. The guiding member 53 is provided with guiding slots 55A and 55B, which have the same shapes, in parallel in the width direction (the vertical direction in FIG. 4). Each guiding slot 55A or 55B is formed in a substantially oval form, as in the example of the illustration, such that the major axis of it lies along the conveying direction. In the guiding slots 55A and 55B, cam followers 57A and 57B, which are suspended from the lower surfaces of the supporting plates 33A and 33B, are movably engaged.

The rotating arms 41 and 51 are synchronously rotated through the rotating shafts 39 and 47 by driving the control motor M2. Thus, the supporting plates 33A and 33B are moved in the horizontal direction through the cam followers 43B and 43A that are engaged with the elongated slots 42 and 52 to cause the shaping plates 11 and 13 to be moved. The movements of the shaping plates 11 and 13 trace a locus along, for instance, the oval shape, of the guiding slots 55A and 55B of the guiding member 53.

Figure 3:
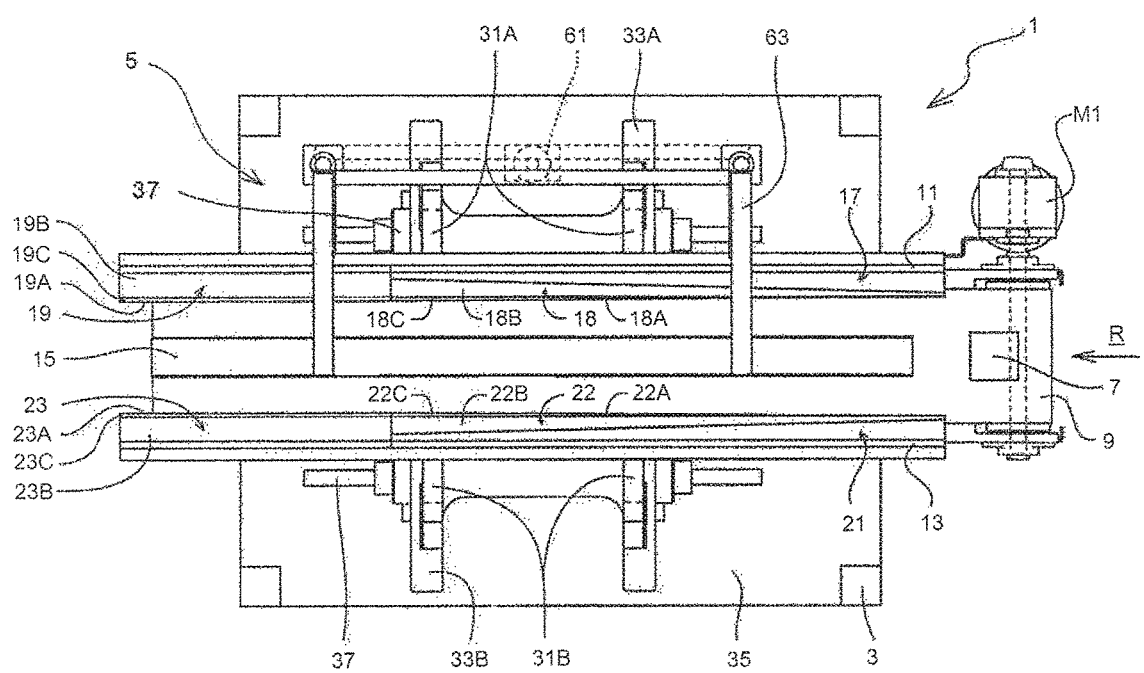
FIG. 3 illustrates a plan view of the general configuration of the rounding machine of the first embodiment of the present invention.
Figure 4:
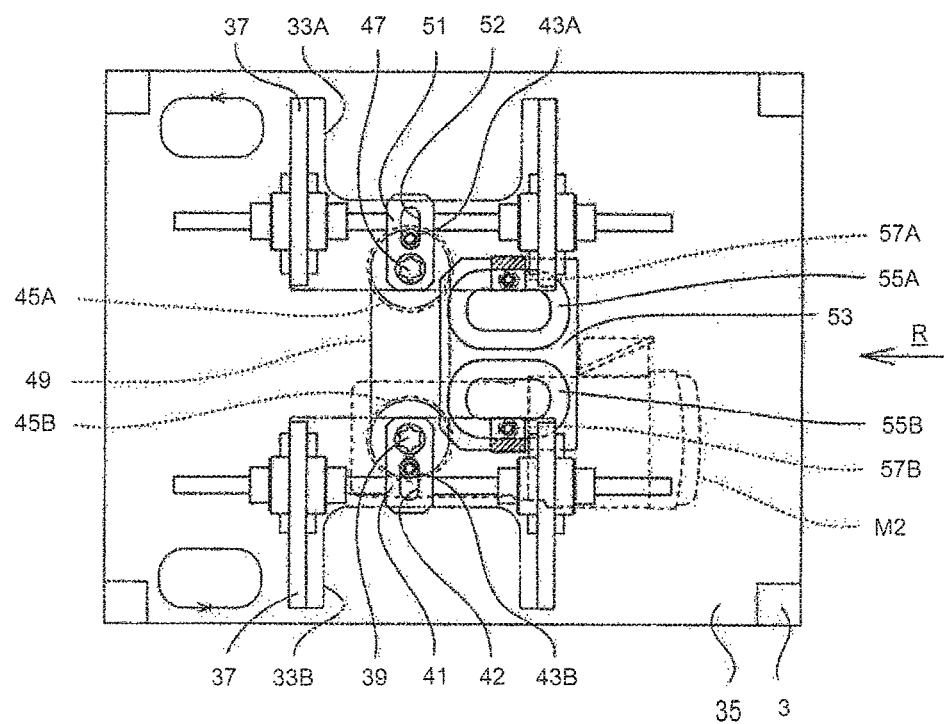
FIG. 4 illustrates a plan view of the driving device for shaping plates equipped with the rounding machine of the first embodiment of the present invention.
Figure 6A:
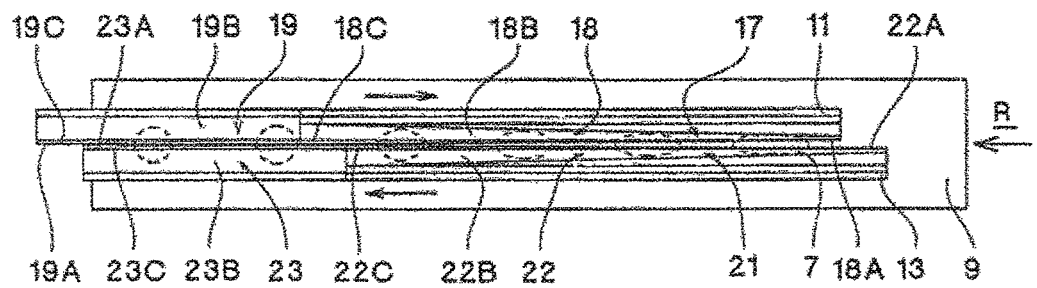
FIGS. 6A, 6B and 6C illustrate plan views showing the operation of the shaping section equipped with the rounding machine of the first embodiment of the present invention.

It is assumed that a state as shown in FIG. 3 is the initial position, i.e., where the shaping plates 11 and 13 are moved. In this position, the shaping plates 11 and 13 are the greatest possible distance apart from each other and are arranged in parallel in the conveying direction. Upon driving the driving motor M2, the shaping plate 11 is moved linearly to the downstream portion of the conveying direction R, while the shaping plate 13 is moved linearly to the upstream portion of the conveying direction R. Then, the shaping plate 11 is inwardly (toward the side of the shaping plate 13) moved, while the traveling direction of it is turned from the downstream side to the upstream side, along the locus of a substantially circular arc. Simultaneously, the shaping plate 13 is moved inwardly (the side of the shaping plate 11), while the traveling direction of it is turned from the upstream side to the downstream side, along the locus of the substantially circular arc, such that the shaping plates 11 and 13 are close to each other (see FIG. 6A). Maintaining the distance between the shaping plates 11 and 13, the shaping plate 11 is moved linearly to the upstream side, while the shaping plate 13 is moved linearly to the downstream side, such that they come abreast of each other at the same position in the travelling direction (see FIG. 6B). Further, the shaping plate 11 is moved linearly to the upstream side, while the shaping plate 13 is moved linearly to the downstream side (see FIG. 6C). Then, the shaping plate 11 is outwardly moved, while the traveling direction of it is turned from the upstream side to the downstream side along the locus of the substantially circular-arc locus such that the shaping plate 11 is moved linearly to the downstream side to return to the initial position. The shaping plate 13 is outwardly moved, while the traveling direction of it is turned from the downstream side to the upstream side along the locus of the substantially circular arc such that the shaping plate 13 is moved linearly to the upstream side, to return to the initial position.

The shapes of the faces, which are formed by the opposed shaping faces 17 and 21, will now be explained with reference to FIGS. 7A to 7C. FIG. 7 illustrates a state in which the shaping plates 11 and 13 come close to each other such that they come abreast of each other at the same position in the conveying direction (see FIG. 6B). FIGS. 7A to 7D illustrate the shapes of the faces as viewed along arrows A-A to D-D in FIG. 6B, respectively, the same positions as shown in FIG. 2. The inner angle between the opposed and inclined faces is denoted by "F" and the distance between the opposed side faces is denoted by "S."

Figure 6B:
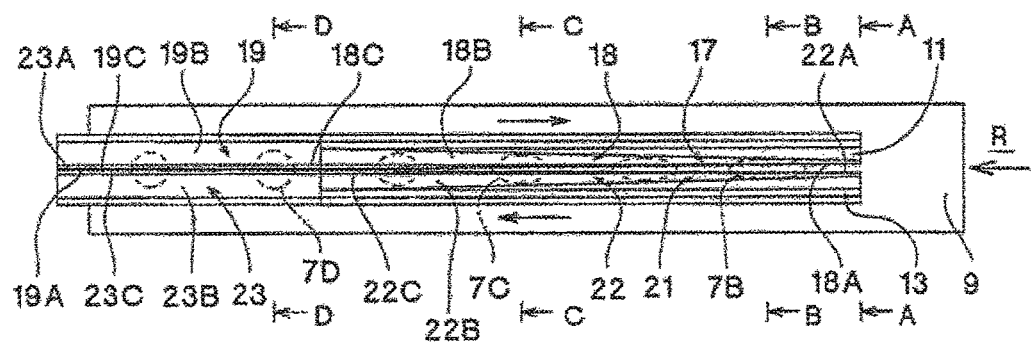
Figure 6C:
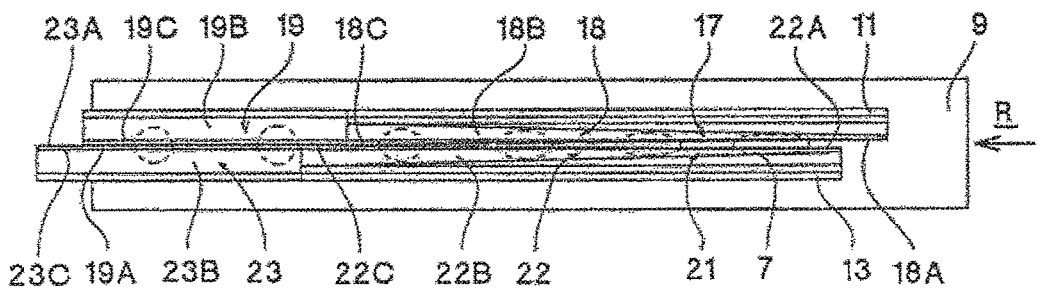
Figure 7A:
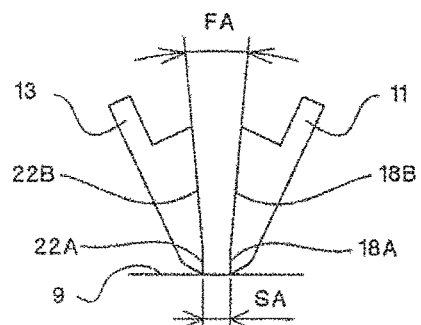
FIGS. 7A, 7B, 7C and 7D illustrate the shapes of the shaping plates equipped with the rounding machine of the first embodiment of the present invention.
Figure 7C:
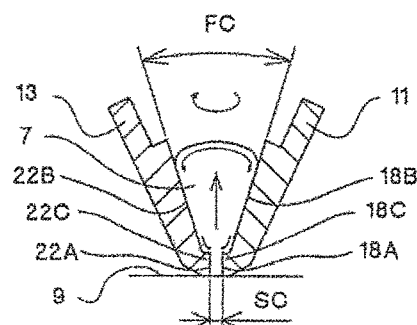
Figure 7B:
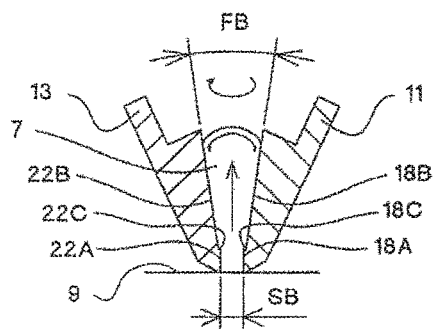

FIG. 7A illustrates the side faces (the ends of the upstream side) of the shaping faces 11 and 13 as viewed along the arrows A-A, as shown in FIG. 6B. The distance SA between the opposed side faces 18A and 22A is the widest possible one compared to a state in the downstream side as described below. The inclined faces 18B and 22B are continuously formed from the upper ends of the side faces 18A and 22A. The inner angle FA between the opposed inclined faces 18B and 22B is the smallest in comparison with the state in the downstream side as described below.

FIGS. 7B and 7C illustrate cross sections of the shaping plates 11 and 13 as viewed along the arrows B-B and the arrows C-C, as shown in FIG. 6B. The distance SB as shown in FIG. 7B is formed to be narrower than the distance SA, while the distance SC as shown in FIG. 7C is formed to be narrower than the distance SB. The side faces 18A and 22A are formed such that they inwardly protrude from the lower ends of the inclined faces 18B and 22B to form the above protruding sections 18C and 22C. The degrees of the protrusions are formed to be great as long as the distance S between the side faces 18A and 22A is narrow. The inner angle FB as shown in FIG. 7B is formed to be larger than the inner angle FA, while the inner angle FC as shown in FIG. 7C is formed to be larger than the inner angle FB.

Figure 7D:
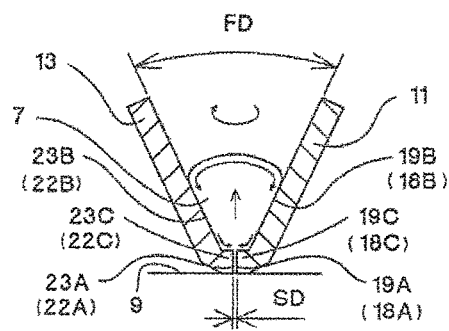

FIG. 7D illustrates cross sections of the shaping plates 11 and 13 as viewed along the arrows D-D, as shown in FIG. 6B. The distance SD between the opposed side faces 19A and 23A is less than the distance SC. The degrees of the inward protrusions of the protruding sections 19C and 23C are largest at the shaping plates 17 and 21. The inner angle FD between the inclined faces 19B and 23B is formed to be larger than the inner angle FC. As discussed above, the distance SD and the inner angle FD are constantly configured along the lengths of the opposed second shaping faces 19 and 20, without any variation. The magnitudes of the distance SD and the inner angle FD are the same as the distance S and the inner angle F that are formed by the opposed first shaping faces 18 and 22 at the downstream ends thereof.

As is apparent from the above description, the distance between the opposed inclined faces 18B and 22B is formed to be less at the lower side and is formed to be great at the upper side. Also, the inner angle F, between the opposed inclined faces 18B and 22B, is varied such that it is continuously increasing from the upstream side, which is the upstream side in the conveying direction of the first belt conveyor (the conveying device) 9, to the downstream side of the shaping plates 11 and 13. The distance S between the side faces 18A and 22A is varied such that it is continuously narrowing from the end of the upstream side toward the longitudinal direction (the downstream side of the conveying direction). The degrees of the protrusions of the protruding sections 19C and 23C, which are formed to inwardly protrude from the lower ends of the inclined faces 18B and 22B, are varied such that they are continuously increasing from the end of the upstream conveyor and toward the longitudinal direction (the downstream side of the conveying direction).

The pressing-down member 15 for pressing-down the dough pieces is located midway between the shaping plates 11 and 13 such that the length thereof is oriented along the conveying direction R. The pressing-down member 15 is drivingly coupled to a reciprocating shaft (a cylinder rod) 61A of a hydraulic cylinder 61, which is mounted on the base plate 35, through a supporting arm 63, to vertically move it. The bottom face of the pressing-down member 15 is provided with a step such that the upstream side of the long side protrudes beneath the lower side relative to the downstream side, to form a protruding section 15A. Thus, in the pressing-down member 15, the distance between the bottom face thereof and the conveying face of the belt conveyor 9 is narrower at the upstream end relative to the downstream end. The pressing-down member 15 is lowered between the shaping plates 11 and 13 after they approach each other to round the bread-dough pieces 7 and when the shaping plates 11 and 13 retract from each other. The pressing-down member 15 is moved up when the shaping plates 11 and 13 approach each other. The pressing-down member 15 presses the bread-dough pieces 7 to strongly flatten out and beat them at the protruding section 15A, while the pressing-down member 15 lightly contacts the heads of the bread-dough pieces 7 at its downstream side (there is no protruding section 15A) (see FIG. 5B). The pressing-down member 15 prevents the bread-dough pieces 7 from sticking to the shaping plates 11 and 13, which retract from each other, to outwardly move, and thus they are shifted from the middle point between the opposed shaping plates 11 and 13.

With one motion, where the shaping plates 11 and 13 approach and retract from each other, and another motion, where the pressing-down member 15 goes up and down, the bread-dough pieces 9 are kneaded, and thus one rounding process is carried out. The rounding machine 1 can be appropriately configured such that one or more rounding processes can be repeated while the belt conveyor 9 is interrupted while it is being conveyed. Because the belt conveyor 9 can be appropriately configured to set the conveying distance (a pitch) of the intermittent conveying, the rounding process for the bread-dough pieces 7 can be repeated at a plurality of stopping positions along the conveying direction R that the belt conveyor 9 travels.

Figure 5B:
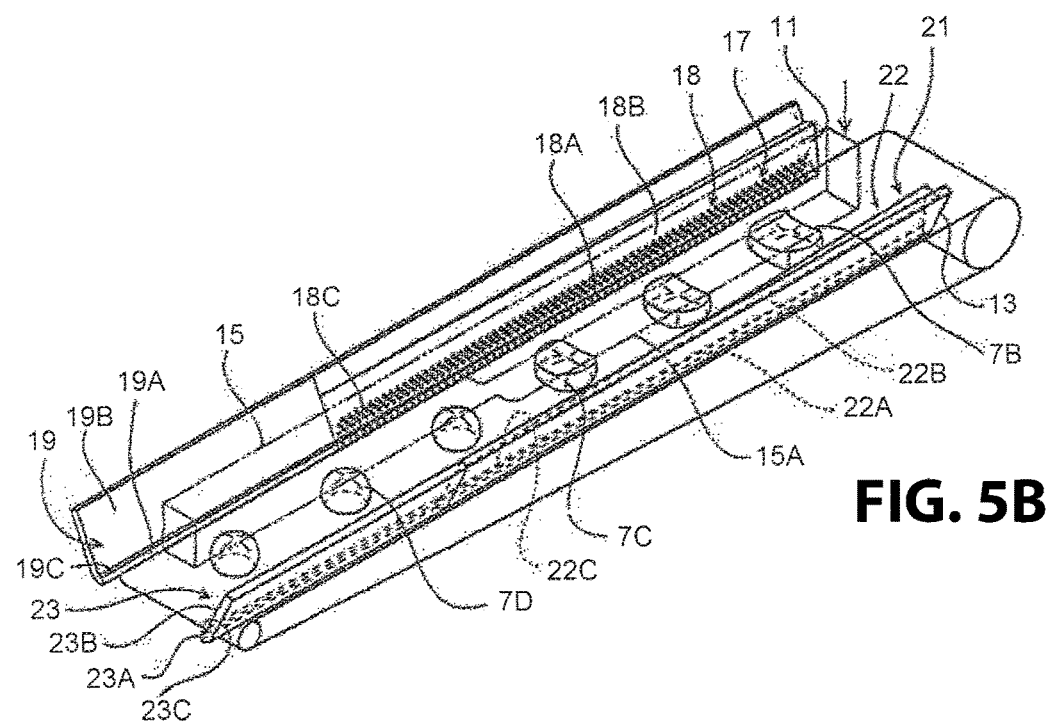

The process of rounding the bread-dough pieces 7 using the above rounding machine 1 will now be explained. It is herein assumed that rectangular bread-dough pieces 7, each cut from a bar-like shaped bread dough to have a predetermined weight, fall and are then supplied on the upstream side (the left side in FIG. 1) of the belt conveyor 9, and rounded in six positions in which the conveying motion is intermittently interrupted per a predetermined distance (a pitch) (see FIGS. 5 and 6). FIG. 5A illustrates a state in which the respective bread-dough pieces 7 are conveyed at the stopping positions. FIG. 5B illustrates a state in which the respective bread-dough pieces 7, which have been kneaded by the shaping plates 11 and 13 at the respective stopping positions, are pressed down from above by the pressing-down member 15.

The bread-dough piece 7 is conveyed a set distance (a pitch) as defined by the belt conveyor 9, and is located between the shaping plates 11 and 13, which have retracted from each other and stopped (seen as viewed along the arrows B-B, as shown in FIG. 6B). Hereafter, this position refers to a first position and the bread-dough piece 7 thereon refers to the bread-dough piece 7B. The shaping plates 11 and 13, which have been stopped, begin to move along the substantially oval locus, approach each other to press and hold the bread-dough piece 7B by the shaping faces 17 and 21, and then move in opposing directions along their respective longitudinal directions. Further, in the position in which they approach each other they move linearly in opposite directions to knead and round the bread-dough piece 7B. In this position, the inner angle FB between the inclined faces 18B and 22B is smaller in comparison with the inner angle F, which is formed in the downstream side along the longitudinal direction, and the opposed gap is smaller. The bread-dough piece 7B is relatively and strongly pressed from its lateral directions to have it rolled out from the vertical direction such that the bread-dough piece 7B is deformed, to then flatten it. The bread-dough piece 7B rotates in a state in which most of the surface thereof contacts the shaping faces 18 and 22. The shaping plates 11 and 13 then begin moving, for instance, along the substantially oval locus, such that they move in opposite directions along their respective longitudinal directions and away from each other, to release the bread-dough piece 7B. When the shaping plates 11 and 13 are positioned apart from each other, the pressing-down member 15 is immediately lowered such that the protruding section 15A flattens out the bread-dough piece 7B from above such that it is pressed and held between the protruding section 15A and the conveying surface of the belt conveyor 9, to roll it out horizontally. Shortly after this, the pressing-down member 15 is moved up. In this position, the rounding process is repeated, for instance, two, three, or four times, such that the bread-dough piece 7 is rounded to remove protrusions and peaks on the surface thereof. With the lateral pressing and holding by the shaping plates 11 and 13 and the rotation, and the beating and pressing coming from above by the protruding section 15A, small and large bubbles (gases) that are non-homogeneous and distributed within the bread-dough piece 7 are dispersed to gradually make uniform the inner layers therein.

Figure 8A:
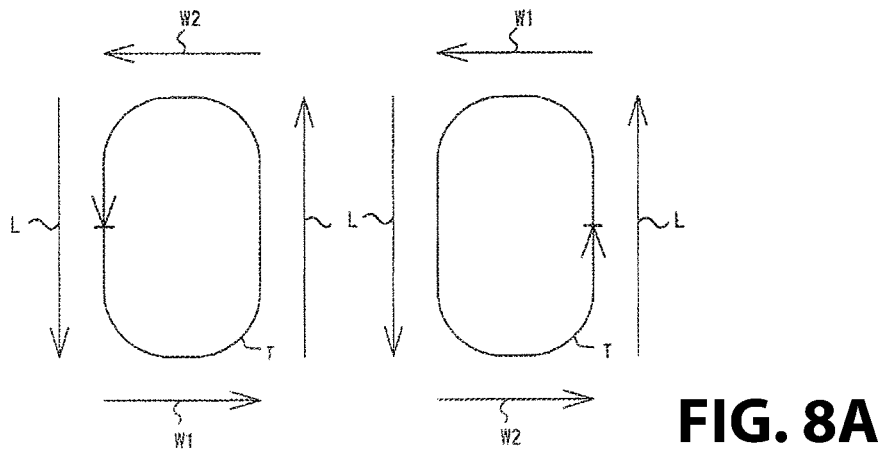
FIGS. 8A, 8B and 8C are diagrams of examples of locuses of the movements of the shaping plates of the machine and the process for rounding dough.
Figure 8B:
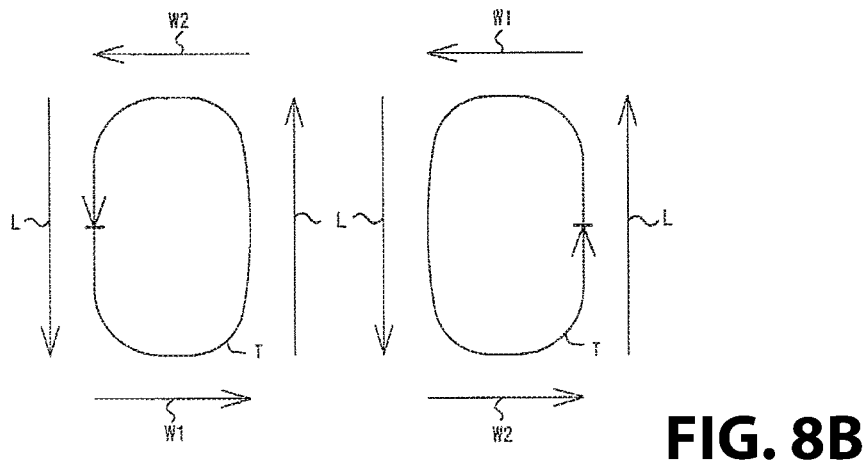
Figure 8C:
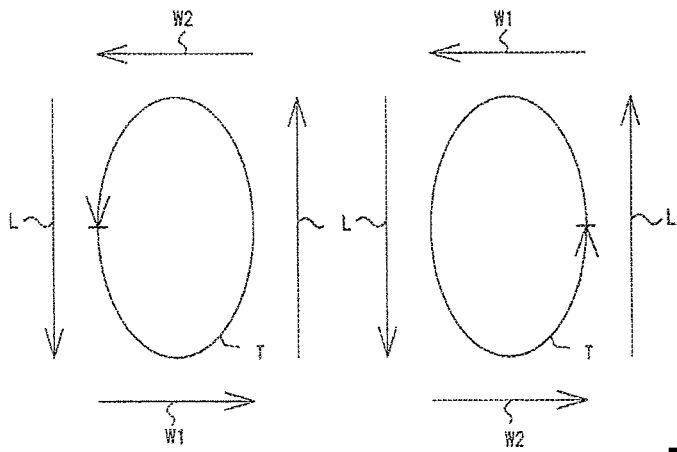

FIGS. 8(a), (b), and (c) show examples of locuses T in which the shaping plate 11 (not shown in FIG. 8, but it is located in the left side therein) and the shaping plate 13 (it is located in the right side in FIG. 8) move. In FIG. 8, an arrow L denotes the direction of the longitudinal component in the kneading process, an arrow W1 denotes the direction of the width component when the shaping plates come close to each other, and an arrow W2 denotes the direction of the width component when the shaping plates move away from each other. In the movement locuses T of the shaping plates 11 and 13, the longitudinal component may trace a substantially linear line, as shown in FIG. 8 (a) and in the above embodiment, but may also trace a nonlinear line. For instance, as shown in FIG. 8 (b), the longitudinal component may protrude in the opposite direction such that it may include a slightly curved arc component or a substantially curved arc component. Alternatively, the movement locus T may trace a substantial ellipse, as shown in FIG. 8(c). Each locus T as shown in FIG. 8 includes the following steps.

Step (a): The bread-dough pieces (the food-dough pieces) 7 of the belt conveyor 9 are laterally pressed and held by the shaping plates 11 and 13 so that they are close to each other in the width component.

Step (b): The bread-dough pieces are kneaded by moving the shaping plates 11 and 13 opposite each other along the longitudinal component when or after the shaping plates 11 and 13 are close to each other.

Step (c): The shaping plates 11 and 13 retract from each other in the width component to release the bread-dough pieces 7 after the shaping plates 11 and 13 are close to each other, and during or after the kneading step.

Step (d): The above steps (a), (b), and (c) are carried out one or more times.

When the bread-dough pieces (the food-dough pieces) 7 are rounded, the shaping plates 11 and 13 affect the bread-dough pieces 7 such that the length of the motion of the longitudinal component is longer than that of the width component, to enhance the kneading effect on the bread-dough pieces (the food-dough pieces) 7.

Note that the movement locuses T as shown in FIGS. 8(a), (b), and (c) are intended to just be examples. The movement locus of the paired shaping plates 11 and 13 of the present invention includes the longitudinal component. In the component, the shaping plates are positioned relatively opposite each other along their lengths and along the width component, in which component the shaping plates relatively approach each other, and move away from each other, along the width direction, which is perpendicular to the length such that the distance moved in the longitudinal component is greater than that in the width component. That is, the movement locus of the paired shaping plates 11 and 13 is not strictly limited to the illustrated locuses. For instance, the traveling distance of the shaping plate 11 may differ from that of the shaping plate 13.

The bread-dough piece 7B is conveyed by one pitch and is stopped at a second position such that it is rounded by the shaping plates 11, 13 and the pressing-down member 15. The bread-dough piece 7B is then conveyed by one more pitch and is stopped at a third position (seen as viewed along the arrows C-C, as shown in FIG. 6B. Hereafter, the bread-dough piece 7 thereon refers to the bread-dough piece 7C). The inner angle FC between the inclined faces 18B and 22B at the third position is greater in comparison with the inner angle F that is formed at the upstream side of the third position. Also, the opposed gap therebetween is wider. In comparison with the rounding process of the bread-dough piece 7B at the first position, the lateral force for pressing and holding the bread-dough piece 7C by the opposed inclined faces is weaker, such that the bread-dough piece 7C is twisted from the upper portion to the lower portion by the inclined faces 18B and 22B, which move linearly opposite each other along their lengthwise directions, to lead a surface layer of the bread-dough piece 7C from its top to the bottom, to tighten the surface skin thereof. Also, because the distance SC between the side faces 18A and 22A is less in comparison with the distance S at the upstream side, and to press and hold the lower end of the bread-dough piece 7C, dough from the lower end of the bread-dough piece 7 is twisted to enhance the effect of leading the surface layer of the bread-dough piece 7C to the bottom thereof. The dough is gathered up in the bottom of the bread-dough piece 7 to form a gathered section. When the shaping plates 11 and 13 retract from each other, the twisting force on the bread-dough piece 7C is released. The pressing-down member 15 is lowered to press down the bread-dough piece 7C from above to prevent the bread-dough piece 7C from sticking to the shaping plates 11 and 13, which retract from each other, and the bread-dough piece 7C shifts from the middle position between the opposed shaping plates 11 and 13. The protrusion section 15A of the pressing-down member 15 is lowered to press, and thus beat, the bread-dough piece 7C from above, to flatten it out. In this embodiment, because each shaping plate 11, 13 constitutes one separate member, the number of the rounding processes, which is the same as that in the first position, is repeated in this third position.

The bread-dough piece 7C is conveyed by one pitch and stopped at a fourth position, in which the bread-dough piece 7C is rounded by the shaping plates 11 and 13. Further, the bread-dough piece 7C is conveyed by one more pitch and stopped at a fifth position (seen as viewed along the arrows D-D, as shown in FIG. 6B. Hereafter, the bread-dough piece 7C that is positioned in this position refers to "the bread-dough piece 7D"). The inner angle FD between the inclined faces 19B and 23B at this position is the largest among the inner angles F between the shaping plates 17 and 21, and the opposed direction is the widest. The bread-dough piece 7D has a configuration in which the dough surface of the lower portion contacts the shaping faces 17 and 21, compared to the bread-dough piece 7C. The twisting effect on the bread-dough piece 7D is more enhanced than that on the bread-dough piece 7C such that the leading effect, i.e., to lead the surface layer to the lower part, is also enhanced. Because the distance SD between the side faces 19A and 23A is the least at the distance S, i.e., between the shaping plates 17 and 21, to strongly press and hold the lower end of the bread-dough piece 7D the dough from the lower end of the bread-dough piece 7D is strongly twisted. Therefore, the lead effect, i.e., to lead the surface layer of the bread-dough piece 7D to the lower part, is enhanced, while the created surface skin is gathered at the lower face (the bottom) to lead the bread-dough piece 7D inside, such that the surface skin of the bread-dough piece 7D forms a strong skin. When the shaping plates 11 and 13 retract from each other, a twisting force on the bread-dough piece 7D is released. The pressing-down member 15 is lowered, to slightly press the top of the bread-dough piece 7D.

Further, the bread-dough piece 7D is conveyed one more pitch and is stopped at a sixth position in which it is rounded by the shaping plates 11 and 13. The inner angle F and the distance S in this position are the same as those in the fifth position. In this position, however, again kneading the bread-dough piece 7 to guide the surface layer to the further lower portion, and gathering the skin that is formed by the opposed side faces 19A and 23A to the bottom to induce it inside the bread-dough piece 7 such that the bread-dough piece 7 having the tight skin can be rounded, are carried out. The pushing-dough member 15 is lowered to slightly press the head of the bread-dough piece 7. Because the viscosity can be decreased if a thin skin is formed on the surface of the dough of the bread-dough piece, the bread-dough piece 7 does not stick to the moving shaping plates 11 and 13. In this manner, the pushing-dough member 15 may not need to press the head of the bread-dough piece 7. Therefore, the pushing-dough member 15 may not always have to be provided with the rounding machine 1 of the embodiment of the present invention.

With the above rounding machine 1, when the bread-dough piece 7 is rounded by the respective stopping positions (the rounding positions), it does not roll in the conveying direction, but maintains the positional relationship between its upper side and lower side. Thus, the guiding direction of the dough that affects the surface layer of the bread-dough piece 7 can be fixed. Further, because the skin that is formed gathers at the bottom of the bread-dough piece 7 repeatedly, the skin of the bread-dough piece 7 can be accordingly guided inside the bread-dough piece 7, such that a tight skin on the bread-dough piece 7 can be efficiently formed. Also, because the shaping plates 11 and 13 move to approach, and retract from, each other, and laterally press, roll, and open on the bread-dough piece 7, and because these steps are repeated such that the bread-dough piece 7 is not be twisted excessively, thus the bread-dough piece 7 is hardly damaged. At least in the earlier stage of the rounding process (the process that is carried out until the third position is reached in this embodiment), when the shaping plates 11 and 13 are retracted from each other, a pressing movement such as beating the pushing-dough member 15 in the vertical direction, as well as laterally pressing the bread-dough piece 7 by the shaping plates 11, 13, causes small and large bubbles (gases) that are uniformly distributed and contained in the bread-dough piece 7 to be dispersed to equalize the inner layers. With the above advantages, the bread-dough piece 7 can be efficiently rounded in a uniform shape.

In general, dough, i.e., so called "bread dough," is not uniform. Rather it refers to various compositions and manufacturing processes for dough, as, for instance, sandwich-loaf dough, sweet-bun dough, and hard-roll dough. If the same rounding process applies to the complete range of bread dough, an appropriately rounded shape cannot thus be obtained. In the rounding machine 1 of the embodiment of the present invention, the stopping positions in the conveying motion of the belt conveyor 9 can be appropriately configured and the number of movements that approach, and retract from, the respective opposed shaping plates 11 and 13 can be appropriately configured such that the total number of rounding movements can be appropriately configured. Further, because the shapes of the opposed shaping faces are varied in the respective stopping positions, the effect on the bread-dough piece 7 can be varied based on the respective stopping positions such that an appropriate rounding process can be carried out to conform with the property and the desired shape to be rounded of the bread-dough (food-dough) piece 7. For instance, any increased number of rounding movements causes the food-dough piece 7 to be rounded tightly, while any decreased number of rounding movements causes the food-dough piece 7 to be rounded loosely.

Although the conveying device of the embodiment of the present invention is generally described above, it is not limited to that device described above. Rather, it can be variously modified within the scope of the appended claims. For instance, although, in the first shaping face 17 (the shaping face 18) the first shaping face 18 and the second shaping face 19 (the first shaping face 22 and the second shaping face 23) are continuously provided in the longitudinal direction, a configuration may be used in which just the first shaping face 18 (the first shaping face 22) may be configured. Further, in the shaping faces 18 and 22 each shape of the face is varied along the length, the side faces 18A and 22A may be formed such that they are arranged to be parallel to each other along the length (the conveying direction), and the degree of an inward protrusion of each protrusion 18C, 22C may be increased from the upstream end to the downstream end. In this case, the lower end of each inclined shaping face 18B, 22B is outwardly inclined from the upstream end to the downstream end.

In the vertical cross-sections of the shaping faces 18 and 22, for instance, the vertical side faces 18A and 22A (vertical lines), the inclined faces 18B and 22B (inclined lines), and the upper surfaces of the protrusions 18C and 22C (horizontal lines), are formed by a straight line (see FIGS. 7A to 7C). Without limiting them, points of intersection or a part or both of the respective straight lines may be formed as curved lines such that the respective faces are continuous. Parts of the shaping plates that form the inclined faces 18B, 22B and parts of the shaping plates that form the protrusions 18C, 22C may be separately provided such that they may adjust inward the protrusions 18C, 22C in and out of the inclined faces 18B, 22B. Further, the driving mechanism for driving the shaping plates 11 and 13 to approach, and retract from, each other, is not limited to the mechanism for causing them to revolve along the guiding slots 55A, 55B. For instance, a fluid cylinder or a linear driver for transforming the rotational movement of the control motor to a linear movement may be used to superimpose a reciprocating movement along the conveying direction and a reciprocating movement along the width direction such that the shaping plates 11 and 13 move to approach, and retract from, each other. In this manner, by controlling the moving position of each shaping plate by the corresponding driving mechanism, the distance between the shaping plates and the linear distance in which the shaping plates move in directions opposite each other can be adjusted.

Figure 9:
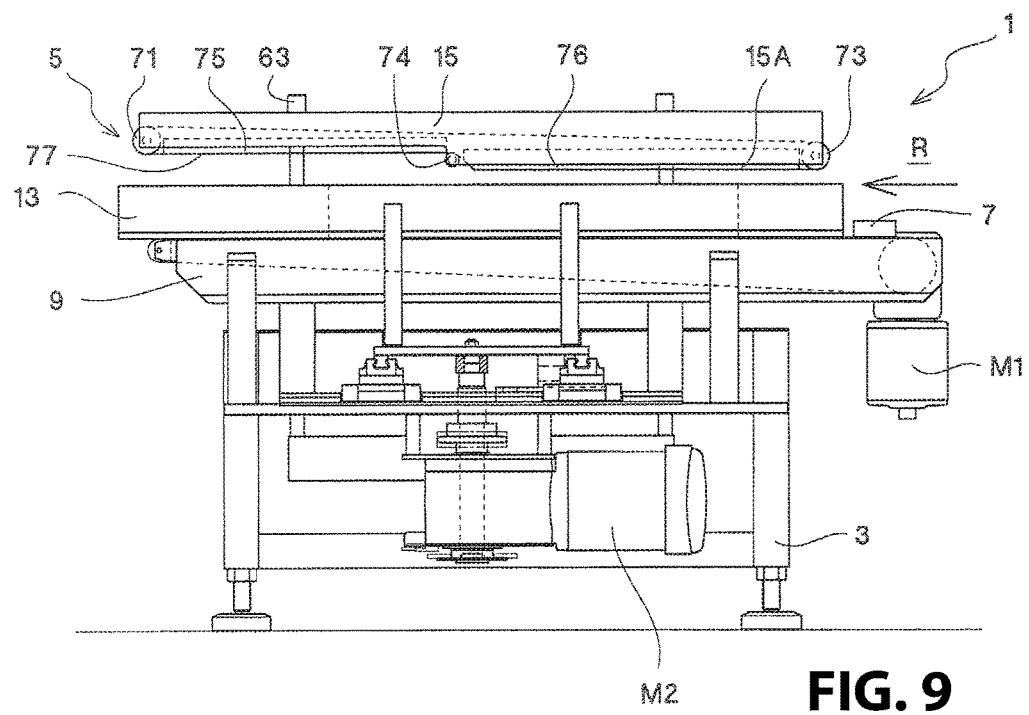
FIG. 9 illustrates a front view of a general configuration of the rounding machine of the second embodiment of the present invention.
Figure 10:
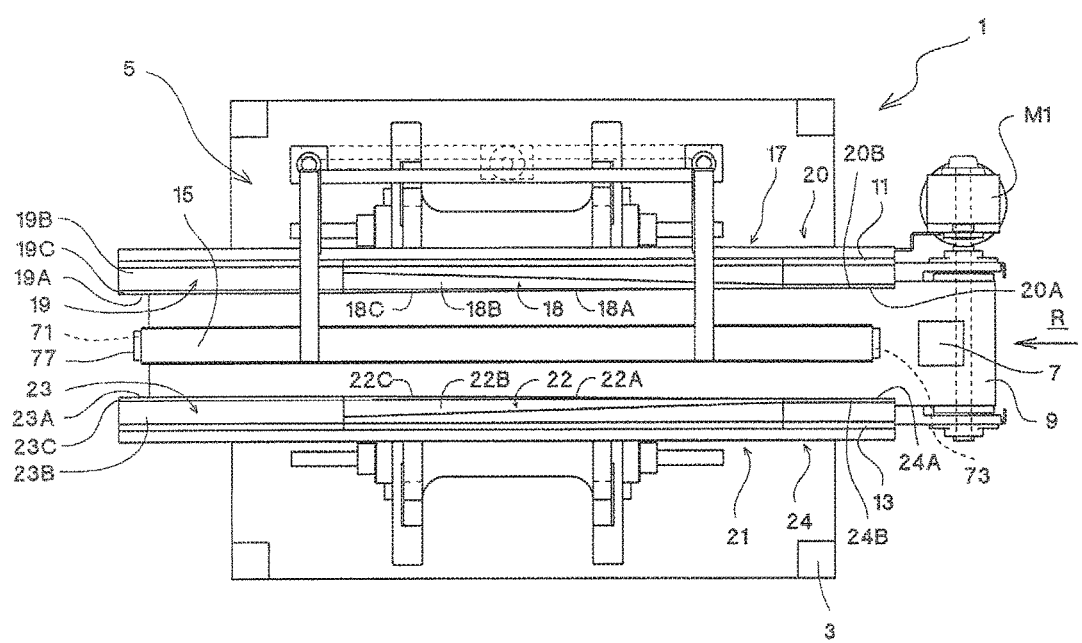
FIG. 10 is a plan view of the general configuration of the rounding machine of the second embodiment of the present invention.

FIGS. 9 and 10 show the rounding machine of the second embodiment of the present invention. The pushing-dough member herein incorporates, instead of the vertical movable pushing-dough member 15 as shown in FIGS. 1, 3, and 5, a second belt conveyor running along the conveying direction R of the first belt conveyor (the conveying device) 9. The second belt conveyor comprises, for instance, a driving roller 73 containing a motor, a driven roller 71, a conveyor belt 77, which is entrained on both the driving roller 73 and the driven roller 71, and plates 75 and 76 for pressing the conveyor belt 77 inward. The conveyor belt 77 is substantially parallel to and above the conveying device (the first belt conveyor) 9 such that it presses the bread-dough piece 7 from the upper side to the lower side. In this case, it is preferable that the velocity of the conveyor belt 77 be the same as that of the conveying device 9.

With the conveyor belt 77 of the second belt conveyor, the bread-dough piece 7 can be pressed without rolling it in the conveying direction. The bread-dough piece 7 that has been released from the shaping plates 11, 13 is conveyed such that it is sandwiched between the conveying device 9 and the conveyor belt 77. In this alternative embodiment, however, the bread-dough piece 7 is not repeatedly rounded at the same position.

FIGS. 9 and 10 also show alternative shaping plates 11, 13. In the alternative shaping plates 11, 13, the second forming surfaces 20 and 24 are provided at the upstream sides of the first shaping plates 18 and 22. The second shaping face 20 (24) of the shaping plate 11 (13) includes the side face 20A (24A) that continues from the side face 18A (22A) of the first shaping plate 18 (22), and the inclined face 20B (24B) that continues from the inclined face 18B (22B) of the first shaping face 18 (22). The inclined face 20B (24B) is formed to have the same incline at the most upstream portion of the inclined face 18B (22B) of the first shaping face 18 (22). The shaping plates 11 and 13 of the rounding apparatus of the first embodiment may be replaced with the shaping plates 11 and 13 of the rounding machine of the second embodiment.

In the above respective embodiments, each of the side faces 18A, 19A, 20A, 22A, 23A and 24A of the shaping plates is illustrated as an example as a perpendicular plane, but is not limited to it. It may be an inclined face (a diagonal line) that outwardly inclines from the lower side to the upper side, or it may be formed as a curve.

Nevertheless, it will be understood that various modifications may be made without departing from the spirit or scope of the invention. For instance, in the machine and the process of the present invention, the shaping plate 11 and the shaping plate 13 do need to be driven, and an embodiment in which one shaping plate is fixed and the other shaping plate is relatively moved to the fixed one may be possible. Of course, to enhance the effect of the rounding process, preferably both the shaping plate 11 and the shaping plate 13 are to be driven. However, depending on the desired degree of the rounding process, there is a case in which driving either the shaping plate 11 or the shaping plate 13 may suffice.

Although the above respective embodiments employ the bread-dough piece 7 as the food-dough piece, the present invention is not limited to it. The machine and the process of the present invention can be applied to any viscous food-dough piece, and are not limited to the bread-dough piece 7.

DENOTATIONS OF NUMBERS

1 Rounding machine
5 Rounding section
7 Food-dough piece
9 Conveyor
11 Shaping plate
13 Shaping plate
17 Shaping face
18 First shaping face
18A Side face
18B Inclined face
18C Protrusion
19 Second shaping face
19A Side face
19B Inclined face
19C Protrusion
21 Shaping face
22 First shaping face
22A Side face
22B Inclined face
22C Protrusion
23 Second shaping face
23A Side face
23B Inclined face
23C Protrusion

The invention claimed is:

1. A rounding machine comprising:
a conveying device (9) for conveying a food-dough piece (7); and
a pair of shaping plates (11, 13) that are arranged above the conveying device (9) such that they extend along the direction (R) of travel of the conveying device (9);
wherein the shaping plates (11, 13) include at least opposed inclined faces (18B, 22B), wherein the inclined faces (18B, 22B) are outwardly inclined from their lower sides to their upper sides such that the distance therebetween is narrow at the lower side and wide at the upper side in order to round the food-dough piece using the inclined faces (18B, 22B) of the pair of shaping plates (11, 13);
characterized in that
a driving mechanism causes the pair of shaping plates (11, 13) to move along a moving locus having a longitudinal direction in which the shaping plates (11, 13) are moved relatively in directions opposite to each other, along the longitudinal direction, and a width direction in which the shaping plates (11, 13) relatively move to approach, and retract from, each other, and along the widthwise direction perpendicular to the longitudinal direction, wherein
the moving locus includes a linear path in the longitudinal direction when the pair of shaping plates (11, 13) round the food-dough piece (7).

2. The rounding machine of claim 1, characterized in that the size of the inner angle (F) between the inclined faces (18B, 22B) is formed to continuously increase from the upstream side to the downstream side of the shaping plates (11, 13).

3. The rounding machine of claim 2, characterized in that the shaping plates (11, 13) have protrusions that are located on the lower ends of the inclined faces (18B, 22B) and inwardly protrude therefrom, the degree of each protrusion continuously increasing from the upstream side to the downstream side of the shaping plates (11, 13).

4. The rounding machine of claim 2, characterized in that the machine further comprises a pushing-down member (15) for pushing down the dough pieces to have them vertically move between the pair of shaping plates (11, 13).

5. The rounding machine of claim 4, characterized in that the pushing-down member (15) is lowered between the shaping plates (11, 13) when the shaping plates (11, 13) retract from each other, while the pushing-down member (15) is moved up when the shaping plates (11, 13) approach each other.

6. The rounding machine of claim 5, characterized in that the pushing-down member (15) is a belt conveyor running along the direction (R) of travel of the conveying device (9).

7. The rounding machine of claim 6, characterized in that the velocity of the belt conveyor is the same as that of the conveying device (9).

8. The rounding machine of claim 1, characterized in that the shaping plates (11, 13) have protrusions that are located on the lower ends of the inclined faces (18B, 22B) and inwardly protrude therefrom, the degree of each protrusion continuously increasing from the upstream side to the downstream side of the shaping plates (11, 13).

9. The rounding machine of claim 1, characterized in that the machine further comprises a pushing-down member (15) for pushing down the dough pieces to vertically move the dough pieces between the pair of shaping plates (11, 13).

10. The rounding machine of claim 9, characterized in that the pushing-down member (15) is lowered between the shaping plates (11, 13) when the shaping plates (11, 13) retract from each other, while the pushing-down member (15) is moved up when the shaping plates (11, 13) approach each other.

11. The rounding machine of claim 10, characterized in that the pushing-down member (15) is a belt conveyor running along the direction (R) of travel of the conveying device (9).

12. The rounding machine of claim 11, characterized in that the velocity of the belt conveyor is the same as that of the conveying device (9).

13. The rounding machine of claim 9, characterized in that the pushing-down member (15) is a belt conveyor running along the direction (R) of travel of the conveying device (9).

14. The rounding machine of claim 13, characterized in that the velocity of the belt conveyor is the same as that of the conveying device (9).

15. A process of rounding food-dough pieces (7) by moving a pair of shaping plates (11, 13) along a moving locus, wherein the pair of shaping plates (11, 13) is arranged to extend along the direction (R) of travel of the food-dough pieces (7) and have at least opposed inclined faces (18B, 22B), and wherein the inclined faces (18B, 22B) are outwardly inclined from their lower sides to their upper sides such that the distance therebetween is narrow at the lower side and wider at the upper side, wherein the moving locus has a longitudinal component in which the shaping plates (11, 13) are relatively moved in directions opposite to each other, along the longitudinal direction, and a width component in which the shaping plates (11, 13) relatively move to approach, and retract from, each other, along the widthwise direction perpendicular to the longitudinal direction, and wherein the moving locus includes a linear path in the longitudinal direction, the process comprising the steps of:
- (a) laterally pressing and holding the food-dough pieces (7) on a conveying device (9) by causing the shaping plates (11, 13) to approach each other in the width direction;
- (b) kneading the food-dough pieces (7) by moving the shaping plates (11, 13) opposite each other along the longitudinal direction while the shaping plates (11, 13) are approaching each other or thereafter;
- (c) releasing the food-dough pieces (7) by retracting the shaping plates (11, 13) from each other in the width direction after the shaping plates (11, 13) approach each other, during or after the kneading step; and
- (d) carrying out the above steps (a), (b), and (c) one or more times.

16. The process of claim 15, characterized in that the food-dough pieces (7) are rounded at a plurality of positions along the longitudinal direction of the shaping plates (11, 13).

17. The process of claim 16, characterized in that the size of the inner angle F between the inclined faces (18B, 22B) is formed to continuously increase from the upstream side to the downstream side of the shaping plates (11, 13).

18. The process of claim 16, characterized in that the shaping plates (11, 13) have protrusions that are located on the lower ends of the inclined faces (18B, 22B) and inwardly protrude therefrom, wherein the distance each protrusion protrudes is continuously increased from the upstream side to the downstream side of the shaping plates (11, 13).

19. The process of claim 15, further comprising the step of:
- (e) at least in the early stage of the rounding process, when the shaping plates (11, 13) are retracted from each other, lowering a pushing-down member (15) that is vertically movable and that is provided between the shaping plates (11, 13) to press the food-dough pieces (7) between the pushing-down member (15) and the conveying device (9) in the vertical direction.

* * * * *